US007234140B2

(12) United States Patent  (10) Patent No.: US 7,234,140 B2
Dortmans  (45) Date of Patent: Jun. 19, 2007

(54) METHOD FOR CREATING A WORKFLOW (75) Inventor: Henricus M. J. M. Dortmans, Panningen (NL)

(73) Assignee: OCE-Technologies B.V., Venlo (NL)

( * ) Notice: Subject to any disclaimer, the term of this patent is extended or adjusted under 35 U.S.C. 154(b) by 425 days.

(21) Appl. No.: 10/197,864

(22) Filed: Jul. 19, 2002

(65) Prior Publication Data

US 2003/0018512 A1 Jan. 23, 2003

(30) Foreign Application Priority Data

Jul. 19, 2001 (EP) ................................. 01202762

(51) Int. Cl.
G06F 9/46 (2006.01)
(52) U.S. Cl. ...................... 718/100; 718/106; 718/107; 707/4; 717/104
(58) Field of Classification Search ................ 718/106, 718/100, 107; 707/4; 717/104
See application file for complete search history.

(56) References Cited

U.S. PATENT DOCUMENTS

| 5,408,663 | A | | 4/1995 | Miller |
| 5,768,506 | A | * | 6/1998 | Randell ........................ 709/202 |
| 6,308,224 | B1 | * | 10/2001 | Leymann et al. ............ 719/310 |
| 6,546,364 | B1 | * | 4/2003 | Smirnov et al. .............. 703/22 |
| 6,867,620 | B2 | * | 3/2005 | Singh et al. .................. 326/121 |
| 7,051,328 | B2 | * | 5/2006 | Rai et al. ...................... 718/102 |
| 2001/0039594 | A1 | * | 11/2001 | Park et al. .................... 709/311 |
| 2003/0036940 | A1 | * | 2/2003 | Leymann et al. .............. 705/8 |

FOREIGN PATENT DOCUMENTS

EP    0 895 169 A2    3/2002

OTHER PUBLICATIONS

Hsieh et al., "Conditional Directed Graph-Based Workflow Process Re-Engineering", Proceedings of APCC/OECC, pp. 1087-1090 (1999).
CIP4 Organization, "JDF Specification Release 1.0", pp. 1-118 (2001).
McClatchey et al., "The Integration of Product Data and Workflow Management Systems in a Large Scale Engineering Database Application", IEEE, pp. 296-302 (1998).
Sadiq et al., "On Capturing Process Requirements of Workflow Based Business Information Systems", Proceedings of the $3^{rd}$ Int'l. Conference on Business Info Systems, pp. 195-209 ((1999).
Sarin et al., "A Process Model and System for Supporting Collaborative Work", SIGOIS Bulletin, 2 2/3, pp. 213-224, (1991).

* cited by examiner

Primary Examiner—William Thomson
Assistant Examiner—Andy Ho
(74) Attorney, Agent, or Firm—Birch, Stewart, Kolasch & Birch, LLP (57) ABSTRACT A method for creating a workflow including at least one structured process with interdependent tasks, and a composite object involved in the process is provided. The method includes defining a model of the object, describing the composite object as an aggregate of constituent elements, wherein each element is an instance of an element type; creating a general workflow by modelling the process as a structured graph comprising tasks with an associated element type, connected according to their dependencies; and associating tasks with elements according to their type to create a specific workflow. The method comprises rearranging the tasks on the basis of the associated element type to increase the number of parallel task-element combinations in the specific workflow. A programmable processing device comprises a mechanism for automatically generating a workflow and a mechanism for operation by one or more users. The device uses the above-described method. A computer program product can be run on a computer to execute the method and automatically create a workflow.

22 Claims, 7 Drawing Sheets

METHOD FOR CREATING A WORKFLOW

BACKGROUND OF THE INVENTION

The present application claims, under 35 USC §119, the foreign priority benefit based on European Patent Application No. 01202762.9 filed Jul. 19, 2001, the entire contents of which are herein fully incorporated by reference.

1. Field of the Invention

The invention relates to a method for creating a workflow comprising at least one structured process with interdependent tasks, and a composite object, e.g., a report or manual, involved in the process. The invention also relates to a programmable processing device comprising means for automatically generating a workflow and means for operation by one or more users and to a computer program product.

2. Discussion of the Related Art

A conventional method of creating a workflow is described in "A Process Model and System for Supporting Collaborative Work", by Sarin et al., SIGOIS Bulletin, 12 (2/3), 1991, p. 213–224. This method disclosed therein comprises decomposing a collaborative process into units of work, or tasks. Tasks have objects as input and output. The result is what is generally known as a workflow. The units of work can be assigned to people who will perform the work, when the workflow is executed.

The conventional method above can be an effective way of creating a workflow. The automatic association of tasks with objects saves time and money during the scheduling process. However, the conventional method for creating a workflow takes insufficient account of the resources available for accomplishing various tasks. This can lead to a workflow in which people or machines wait idly for another task. Such a workflow results from a lack of insight into the way in which objects are mutually dependent. For example, a product manual does not have to be printed and bound before translation can be started. It is sufficient that a finished text or part of the text has been agreed upon. The two tasks are, to a large extent, independent of one another. They can be executed concurrently. Known methods for creating a workflow do not take account of the relation between constituent parts of a composite object.

SUMMARY OF THE INVENTION

Accordingly, it is an object of the present invention to provide a method for creating a workflow that makes more efficient use of available resources.

It is another object of the present invention to provide a method for creating a workflow that overcomes problems and limitations of the related art.

To this end, a method for creating a workflow according to an embodiment of the present invention comprises rearranging the tasks on the basis of the associated element type for creating parallel task-element combinations in the specific workflow. Thus, the allocation of tasks to participants is performed in an effective and efficient manner. The resultant workflow allows greater concurrency of performance of tasks when it is later carried out.

In a first embodiment of the invention, the method for creating a workflow comprises the step of checking the suitability of the general workflow for further use in the method. Thus, a general workflow that has been modelled in a way that is unsuitable for rearranging can be filtered out at the start of the method. The general workflow can then be modelled differently, to ensure that the method leads to a satisfactory outcome.

In a particular preferred embodiment, the suitability of the general workflow is checked by checking that branching paths in the general workflow split and join at tasks with the same associated element type, and that types associated with tasks in the paths are not higher in a type hierarchy than the types associated with the tasks where the branching paths split and join.

The method for creating a workflow according to the present invention is primarily intended for use in programmable processing devices, for instance, a computer or automated processing equipment. It is therefore advantageous to use a suitable representation of object and workflow. To this end, the present method comprises modelling the workflow as a Petri-Net, which includes places representing a task, transitions, and directed connections between the places and transitions. Such a model of the workflow makes the present method well suited to implementation in a computer program, for instance, using object oriented programming techniques.

The programmable processing device according to an embodiment of the invention includes the means for generating a workflow that makes use of the method according to the invention.

BRIEF DESCRIPTION OF THE DRAWINGS

The present invention will now be explained in further detail with reference to the enclosed drawings, of which.

DETAILED DESCRIPTION OF THE PREFERRED EMBODIMENTS

A workflow can be described as a schedule of a process in whole or part, during which objects, documents, information or tasks are passed from one participant to another for action, according to a set of procedural rules. Almost any process or object can be incorporated in such a workflow.

Figure 1:
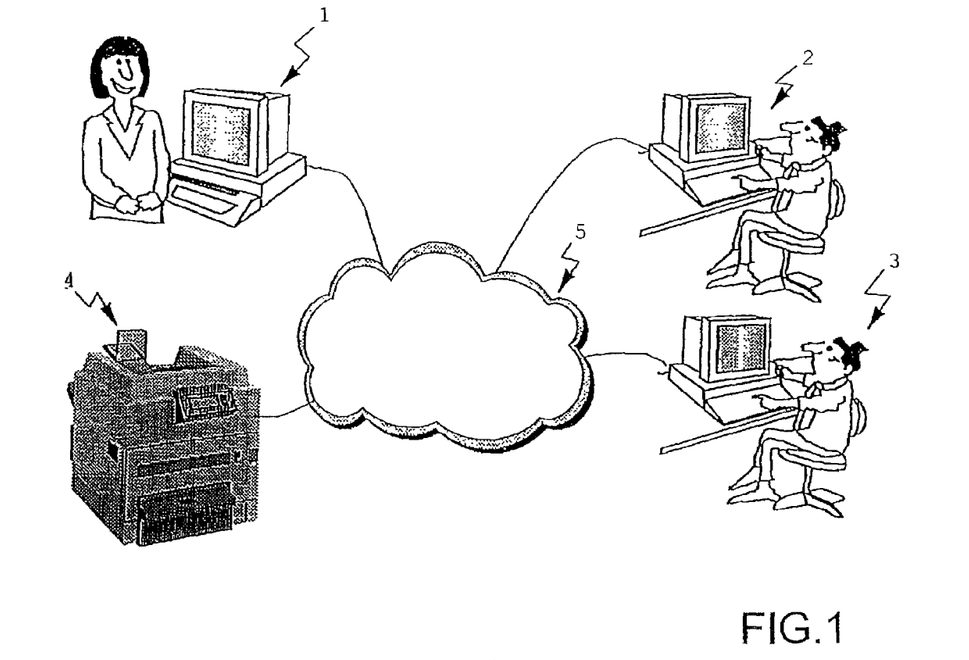
FIG. 1 shows a schematic diagram of an environment in which a workflow, involving one or more participants and obtained by a method of the present invention, can be used.

One example is the creation (the process) of a document (the object) by members of a group of coworkers 1–4, as illustrated in FIG. 1. In the present invention, individuals and/or individuals' devices belonging to a group are referred to as coworkers. The coworkers may possess different types of equipment and/or skills. For example, the first member of the group may be the group leader 1. She could have at her disposal a computer with software for scheduling, making presentations, etc. The second member could be a technical writer 2 located in the R&D centre. He may have at his disposal a word processor and CAD-system. His other coworker could be a translator 3 located in his native country with a database and wordprocessor at his disposal. The fourth member may be a print shop 4 where the finished versions of the documents are all printed. The print shop 4 is represented by the printer.

The members 1–4 of the group are involved at different stages in the process. A workflow can be used to make sure that every member 1–4 of the group is involved at the right stage in the process, according to his or her capabilities. In the embodiment shown, the members 1–4 of the group are in contact with each other through a network 5. The networks could be the corporate intranet, some other local network, or maybe the Internet.

The computer of one or more of these members 1–4 of the group of coworkers can be programmed to carry out the method for creating a workflow according to the invention. This method will provide a rearranged workflow, which makes more efficient use of the members 1–4 of the group. The workflow created by this method can be used to monitor and control the group's process. In the situation just described, the invention is used to create a workflow wherein the time during which group members need to wait for each other, is kept to a minimum.

The sorts of workflow with which the invention is concerned, are those involving three entities: elements, a process model or general workflow, and participants.

An element in a workflow created by the method of the invention has a certain type associated with it and a status. As an example, chapter one in a document would be of the type 'Chapter' and can have status 'written but not reviewed'. Page 12 in a booklet has type 'Page' and may have the status 'printed but not sorted'.

Figure 2:
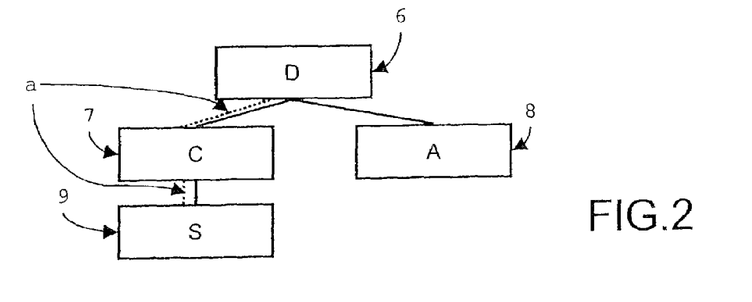
FIG. 2 shows an element type structure for a composite object comprising elements to be used in creating an example of a workflow that can be executed in the environment of FIG. 1.

Types are in a certain relation to each other, graphically modelled in an element type structure. FIG. 2 shows an example of an element type structure usable in the present invention. This element type structure is adapted to the example situation of FIG. 1.

The method for creating a workflow according to the present invention uses element type structures that are directed acyclical graphs. This term describes the fact that the element types are in a hierarchical relation to each other.

The element type at the top can be described as the parent of certain of the constituent element types, the children. A constituent element type can itself be the parent of a further 'child' element type. Attributes can be inherited from a parent by a child or passed by a child to a parent. A child cannot have more than one parent, but a parent can have more than one child. This ensures the acyclical nature of the element type structure.

The element type structure of FIG. 2 schematically represents the relation between various kinds of elements comprised in a document to be created by the (networked) members 1–4 of the group of coworkers in FIG. 1. Every model of the composite object comprises one root element representing the composite object in its entirety. In this case, as shown in FIG. 2, the type of the root element is 'Document' 6. An element of type 'Document' 6 is composed of a number of chapters and a number of appendices. Say there are twelve chapters, then each of these is of type 'Chapter' 7. Likewise, all appendices are elements with type 'Appendix' 8. The last two element types 7 and 8 are at a lower level in the hierarchy of the element type structure. Elements of these types 7 and 8 are child elements; together, they constitute a parent element of type 'Document' 6. The 'Document' 6 type is therefore at a higher level than the other two types 7 and 8 in the element type structure of FIG. 2. An element with a type at a lower level in the type structure can itself be made up of other elements. For example, chapter one in a document can comprise sections 1.1 to 1.5. Each of these sections is an element of type 'Section' 9. Because a group of elements of that type 9 make up an element of type 'Chapter' 7, the type 'Section' 9 is placed below the type 'Chapter' 7 in the element type structure of FIG. 2.

According to one embodiment of the present invention, the element type structure is the same for all documents. The element type structure can therefore be used again when a workflow needs to be created for the production of further documents, even if they contain a different number of chapters.

The second entity to be defined at the start of the method of the present invention is the general workflow, a model of the process. The general workflow is composed of a number of tasks. For instance, tasks in the creation of the document can be the writing of a section, the reviewing of a chapter, or the publishing of the document.

The general workflow is structured, i.e. tasks are interdependent. The tasks cannot be executed in any random order. For instance, a chapter cannot be reviewed before its sections have been written, a page of text cannot be printed before the paper has been retrieved from the drawer, etc.

Tasks may have attributes defining the type of element they work on, the state of the element at the start and the end of the task, and the skills or resources a participant in the process must have to carry out the task.

This brings up the third entity involved in a workflow: the participants. The concept of participants is used to refer to the resources needed to perform the tasks on the elements. It is advantageous to characterize participants by so-called roles, describing their capabilities.

Referring to FIG. 1, the group leader 1 might have the role 'reviewer'. The technical writer 2 will have the role 'writer'. The translator 3 has the role 'translator'. The print shop 4 has the role 'printer'. More than one user can have the same role; e.g. the group leader 1 could then also have the role 'writer'. The group leader 1 would then have two roles, but the method for creating a workflow according to the invention places no fundamental restriction on the number of roles a participant can have. Roles are merely a handy concept for preventing the use of inadequate resources to perform a task.

Although, in the example just described, almost all the participants are human, this need not be the case. The method for creating a workflow according to the invention is equally suitable for creating a workflow in a plethora of different settings.

It is, for example, conceivable that the method for creating a workflow according to the present invention is used to increase the efficiency of a manufacturing process, for example, the assembly of a mechanical device. The participants would in such cases comprise the resources needed in the manufacturing process, e.g. the machines, tools, components and workers needed to assemble the device.

Another workflow in the present invention could be a process in a computer, for example, a process occurring in an image processing. The composite object to be processed would be an image comprising a number of elements. These elements could be characters, pixels, or vectors, but also the properties of the image such as the contrast or depth of colour. Tasks might be the removal of blemishes, data compression, increasing the contrast, etc. Participants would in this case be the resources needed for image processing. These resources can comprise the software processes and the physical computing resources that limit the number of possible parallel processes.

The method for creating a workflow according to the invention could also be used in situations where several workflows interact with each other. Such workflows can be combined and then rearranged using the method of the invention, to improve the resulting aggregate workflow. An example of such a situation is a complex computing project involving several computers in a network, like the Internet. Software processes on the computers form the participants; the data to be processed is the composite object. Processes on the different computers affect each other. They can be combined into one aggregate workflow, which can then be rearranged using the invention, in order to make good use of the available processing capacity.

Although suitable for almost any kind of object, the method for creating a workflow according to the present invention is particularly suited for creation of a workflow using structured objects.

The method according to the present invention creates a specific workflow containing combinations of tasks and associated elements. It is important to make a distinction between elements and element types. An element is an instance of an element type. There is a similar difference between a general workflow and a specific workflow. A general workflow relates tasks to element types, whereas a specific workflow combines tasks with elements. A general workflow can therefore be used for creating a second specific workflow for a second composite object with the same element type structure as the first.

As an example, the specific workflow might contain a combination 'write chapter/chapter three', or 'print black and white/page five'. The general workflow would contain combinations like 'write chapter'/'Chapter', 'print black and white'/'Page'.

The method for creating a workflow according to the invention arranges the task-element combinations in such a way, that they are scheduled to be carried out in parallel as much as possible. Thus, 'write chapter/chapter five' might be carried out in parallel to 'translate section/section 2.1'. 'colour print illustration page/illustration one on page five' might be carried out in parallel to 'print black and white/text block 1 on page 7'.

The coupling of participants to tasks is not part of the method according to the present invention. This coupling would take place during execution of the workflow.

Some important steps in the method for creating a workflow according to an embodiment of present invention will now be explained in more detail using the overview provided in the flow chart of FIG. 3.

In a first step 10, the element type structure is defined. This means the composite object is modelled as an aggregate of elements, each identified by their type. The relations between types are represented by the element type structures, as exemplified in FIG. 2.

Applied to the present example of creating a document, the first step 10 of the present method will result in the element type structure of FIG. 2, discussed above.

Returning to FIG. 3, a second step 11 in the present method involves defining the general workflow in terms of tasks and associated element types. The relation between the various tasks, primarily the order in which they can be executed, is defined at this stage. Only an element type, and not an element, is associated with each task.

Figure 3:
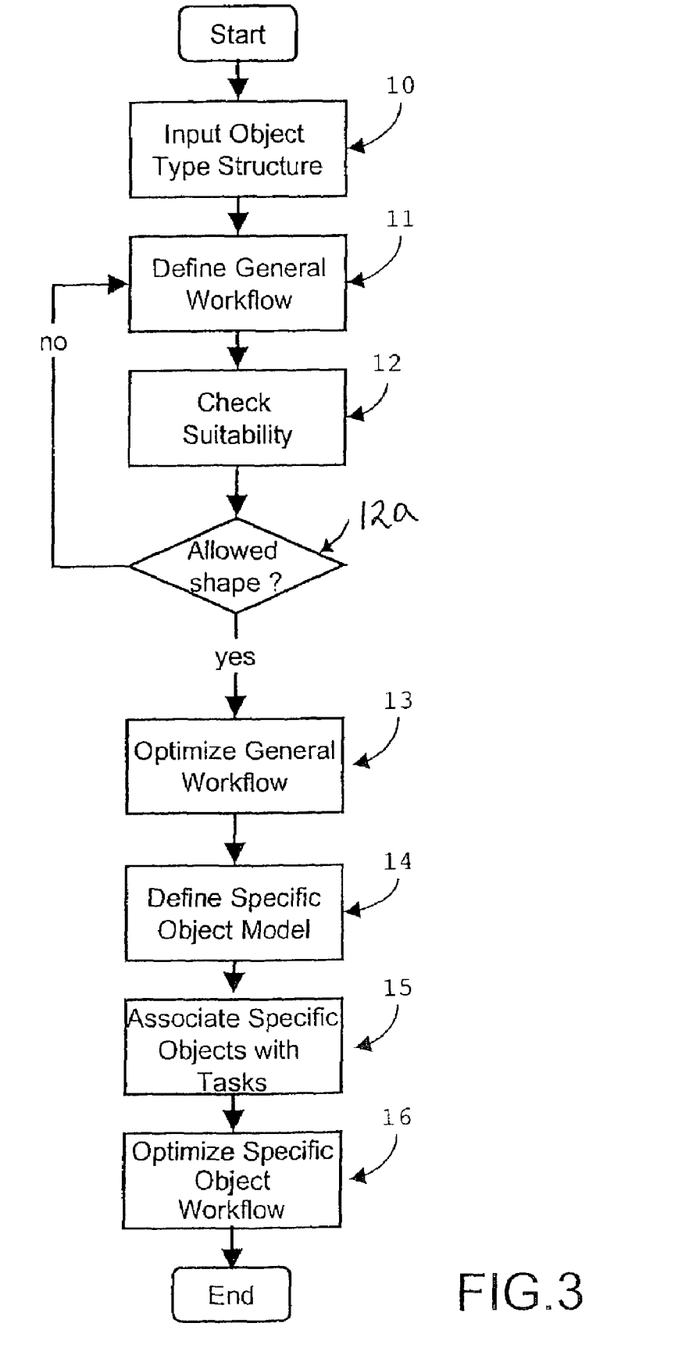
FIG. 3 shows a flow chart illustrating some steps in a method for creating a workflow according to an embodiment of the present invention.
Figure 4:
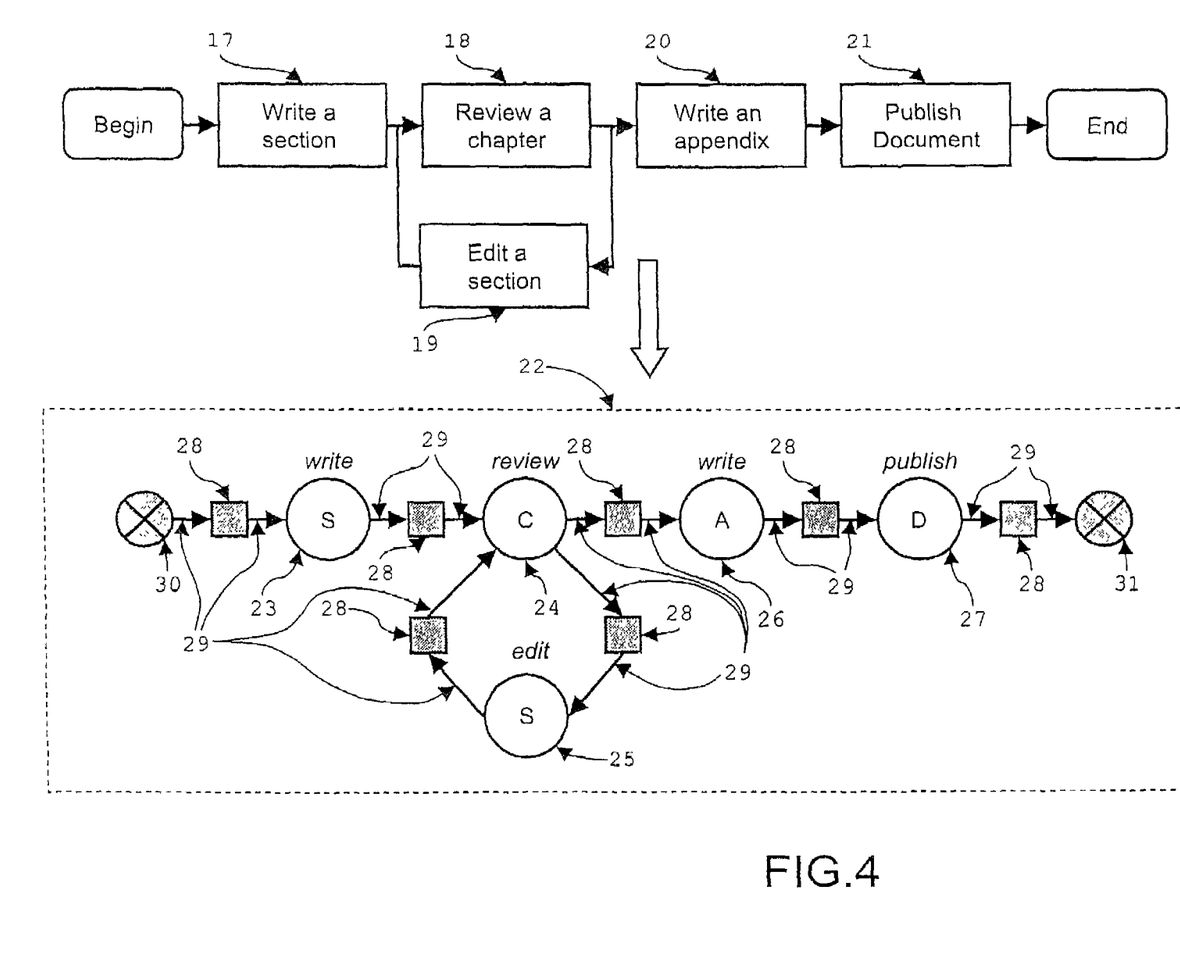
FIG. 4 shows an application of step 11 in the flow chart of FIG. 3, resulting in a general workflow for the group of coworkers of FIG. 1, according to an embodiment of the present invention.

FIG. 4 shows one application of this step 11 in the method of FIG. 3 to create a workflow for the group members 1–4 of FIG. 1 according to an embodiment of the present invention. One task 17 in the process is the writing of a section. Subsequent to this task 17, a task 18 of reviewing a chapter can be defined. An optional task 19 might be the editing of a section. Another task 20 would be the writing of an appendix. A final task 21 can be the publishing of the document.

In the method according to an embodiment of the present invention, a process is modelled as a Petri-Net, resulting in a general workflow 22. In the particular embodiment of the invention here described, the tasks 17–21 are modelled as so-called places 23–27, respectively.

Like other Petri-Nets, the general workflow 22 further comprises transitions 28 between the places 23–27 and directed connections 29 between the places 23–27 and transitions 28. Another embodiment of the method according to the invention is possible, wherein the tasks 17–21 are modelled as transitions. Mathematically, there is a duality between places and transitions, so the invention does not depend on the particular manner of representation chosen. For consistency, only the implementation wherein places represent tasks will be described here.

The directed connections 29 define the relation between the places 23–27, i.e. the order in which the tasks 17–21, which they represent here, can be executed. A transition 28, in the embodiment of the method described here, represents a checkpoint. The presence of checkpoints is important to the execution of the specific workflow, because the tasks represented by the places directly after a transition 28 can be executed only when all the tasks in the places leading to this transition 28 have been completed. The general workflow further comprises a starting point 30 and an end point 31, defining where the execution of the general workflow 22 starts and at what point the general workflow 22 has been completed.

It is important to define the process with care. In particular the association of element types with places is an important aspect. Which element types are associated with which places partly determines the efficiency with which the created workflow can be carried out. For example, if the root element type is associated with all the tasks, then they will all need to be executed sequentially, leaving no scope for using the present method to rearrange the workflow.

Additionally, certain kinds of general workflow comprising branching paths should be checked. Accordingly, a third step 12 in the flow chart of FIG. 3 comprises checking the suitability of the general workflow for further use in the present method. This step will be explained with reference to FIGS. 5, 6 and 7.

Figure 5:
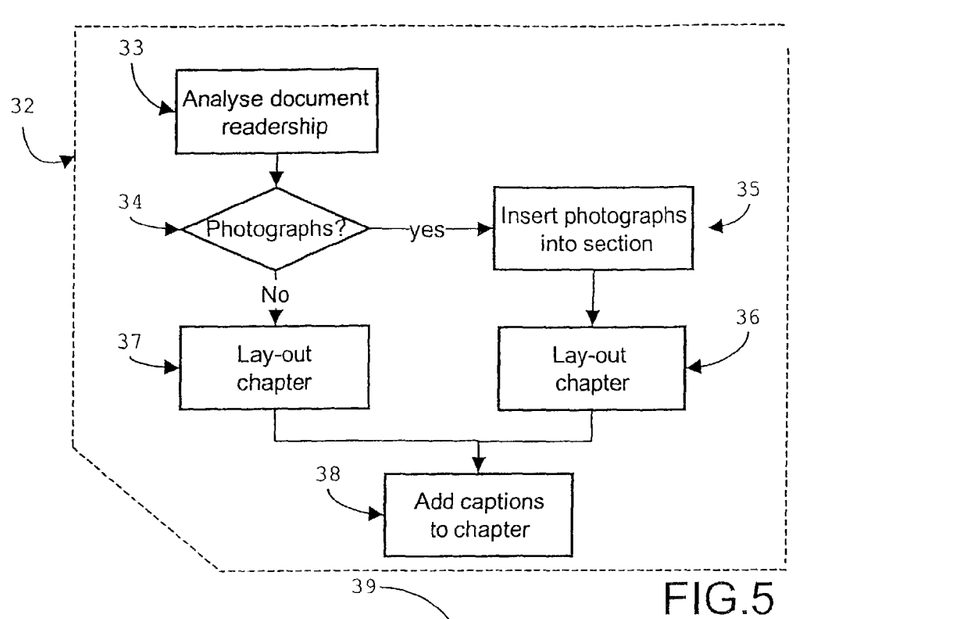
FIG. 5 shows another example of a process model from which to create a general workflow for the group of coworkers of FIG. 1 according to an embodiment of the present invention.

FIG. 5 shows a second example of a process model 32 from which to create a general workflow according to an embodiment of the present invention. Again, this process model is intended for use by the members 1–4 of the group of coworkers in FIG. 1 and makes use of the element type structure of FIG. 2. Additionally, it comprises two branching paths, which in this case are conditional paths; some tasks are only to be executed when certain conditions have been met.

The process shown in FIG. 5 can be used in the creation of a manual. Rather than adding technical drawings as illustrations, it might be useful to add photographs, so a reader not versed in reading technical drawings can more easily recognize the parts of the product to which the manual refers.

Referring to FIG. 5, a first task 33 in the process model 32 is to analyze the document's targeted readership. A second task 34 is to determine the need and suitability for photographs from the contents of the sections of the document. A section on how to contact product representatives does not need photographs, for instance. If a section is suitable for photographs, a task 35 would be to add photographs to a section. Afterwards, in another task 36 the layout of chapters should be reviewed, to check the text flow around the photographs. If it has been determined that no photographs should be inserted, a similar step 37 of reviewing the layout can be carried out straight away. Afterwards, a last step 38 in the process model 32 is to add captions to the photographs in the chapter and/or reference numerals to the text of the chapter.

Figure 6:
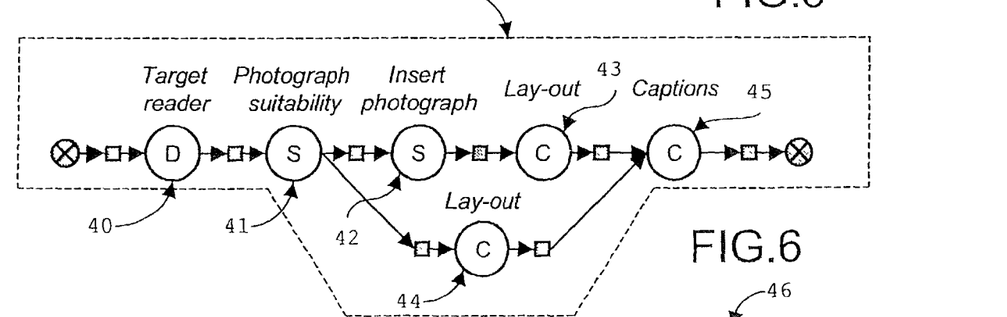
FIG. 6 shows an example of a general workflow created from the process model of FIG. 5 by modelling the process as a Petri-Net, which general workflow would be detected as unsuitable in a step in the method according to the present invention.

A description of the process model 32 as given above could easily lead to the definition of a general workflow 39 as shown in FIG. 6 according to an embodiment of the present invention. Referring to FIG. 6, a first place 40 represents the task 33 of analyzing the targeted readership. A second place 41 represents the task 34 of determining the need and suitability for photographs. In this general workflow 39, the type associated with the second place 41 is 'Section' 9. Depending on the outcome of the second place 41, the upper or lower branch of the general workflow 39 will be taken. The upper branch comprises places 42 and 43 representing the tasks 35 and 36 of inserting photographs into sections and reviewing the layout of a chapter, respectively. The lower branch contains a place 44, which represents the task 37 of reviewing the layout of a chapter with no illustrations. The branches join at a last place 45, representing the task 38 of adding captions and/or reference numerals to a chapter.

This general workflow 39 contains an error, which would normally become apparent only during execution of a specific workflow created from it. In the method according to the present invention, this error may lead to problems in the later stages of creation of the rearranged workflow.

The problem lies in the type 9 associated with the second place 41. It is not the same as the type associated with the place 45 where the upper and lower branches of the general workflow 39 join together. Also, the type 7 associated with one place 43 in the upper branch is higher in the element type hierarchy than that of the type 9 associated with the place 41 where the branches split.

To overcome this problem, according to the method described herein, the third step 12 in the flow chart of FIG. 3 comprises checking a general workflow with branching paths against two rules by determining in a step 12a whether the branching paths/shape of the workflow is allowed. In the first rule, branches should split and join at places with the same associated type. In the second rule, element types associated with places in the branches should not be higher in the element type hierarchy than the element types associated with the places where the branches split and join. If the branching shape of the workflow passes the first and second rules at the step S12a, then a step S13 is performed. Otherwise, the present method returns to the step S11.

Figure 7:
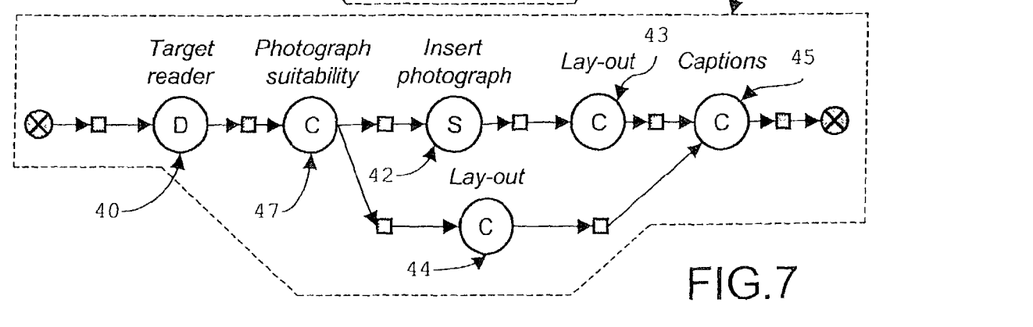
FIG. 7 shows another example of a general workflow created from the process model of FIG. 5, wherein the general workflow is suitable for the method of creating a workflow according to an embodiment of the present invention.

FIG. 7 shows a general workflow 46 derived from the same process model 32 as the general workflow 39 of FIG. 6 according to an embodiment of the proposed invention. This general workflow 46 would pass the test set in the third steps 12 and 12a of the invention. The branching paths now originate from a place 47 with type 'Chapter' 7 associated with it.

Figure 8:
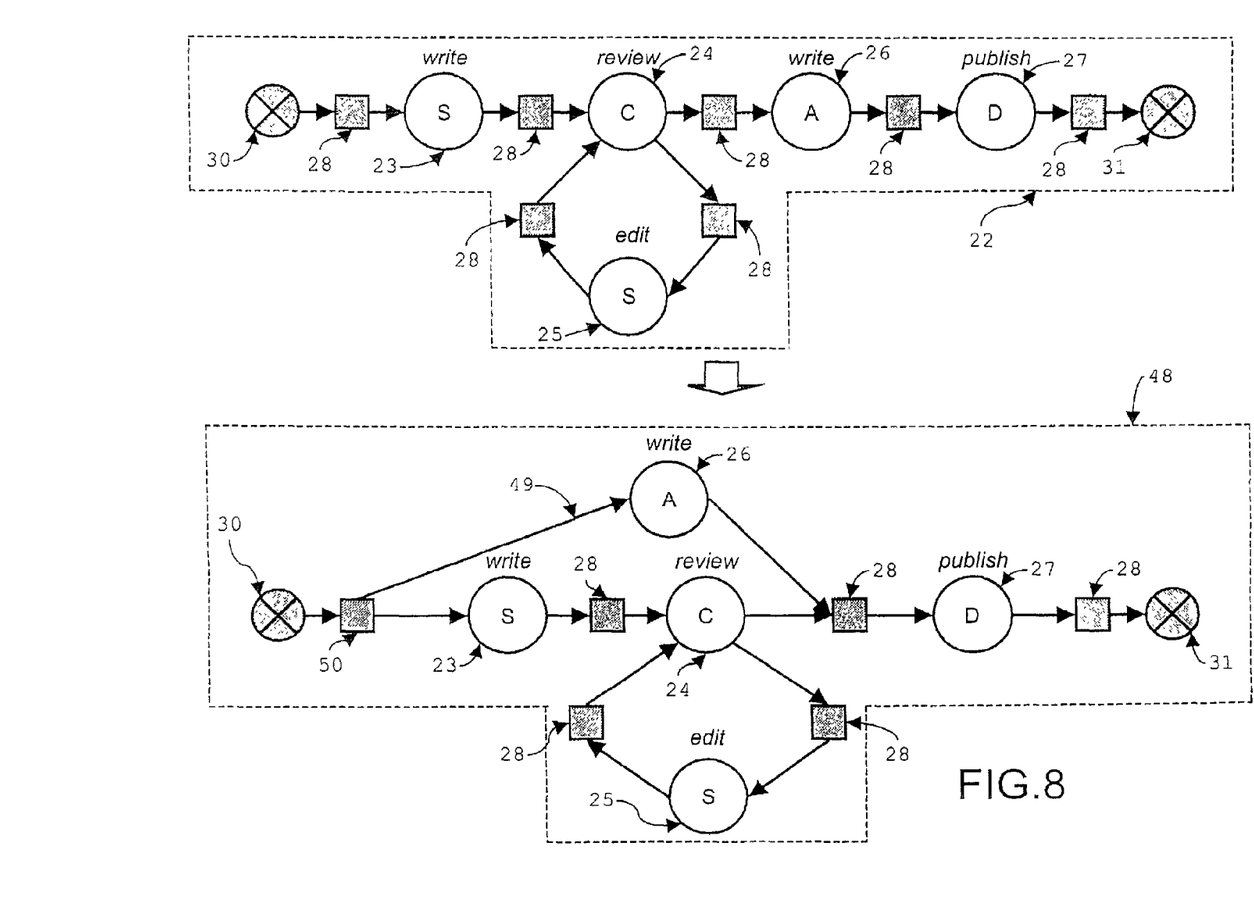
FIG. 8 shows one application of a further step in the method of FIG. 3, in which the general workflow of FIG. 4 is rearranged according to an embodiment of the present invention.

After the general workflow has passed the test comprised in the third steps 12 and 12a of the flow chart of FIG. 3, a next step 13 in the shown embodiment of the invention is to rearrange the general workflow 22,39 or 46. FIG. 8 shows the application of this step 13 to the general workflow 22 of FIG. 4 according to one embodiment of the present invention. This step 13 comprises determining for each transition 28 whether the starting points of directed connections 29 leading to it can be moved back (i.e., in a direction contrary to that of the directed connections), in order to increase the number of parallel places.

To do this, the present method takes account of the interdependency between two element types in an element type structure. Two element types are interdependent if a path exists from the root element type at the top of the structure to an end point of a branch at the bottom level of the structure on which both element types lie. Referring to FIG. 2 for an example, the types 'Chapter' 7 and 'Section' 9 are interdependent, because they both lie on the dashed path labelled "a". If a transition occurs between two places with non-interdependent associated types, the directed connections between these places and the transition are broken and rearranged. The tasks represented by these two places will be scheduled to be executed concurrently instead of sequentially.

In the example of FIG. 8, the element type 7 associated with the place 24 representing the task 18 of reviewing a chapter, and the element type 8 associated with the place 26 which represents the writing of an appendix, are not interdependent. Therefore, the directed connection leading to the transition between these two places 24 and 26 can be broken and moved back to rearrange the workflow so as to produce a rearranged general workflow 48. It can be seen from the rearranged general workflow 48, that the result produces a directed connection 49 between the first transition 50 and the place 26 representing the writing of an appendix. In the rearranged general workflow 48 of FIG. 8, the other places 23, 24, 25 and 27 remain in the same position as in the original general workflow 22.

This step 13 in the method according to the invention embodies the realization that writing of an appendix is a task, which does not depend at all on the results of writing the sections of the chapters in the document.

Figure 9:
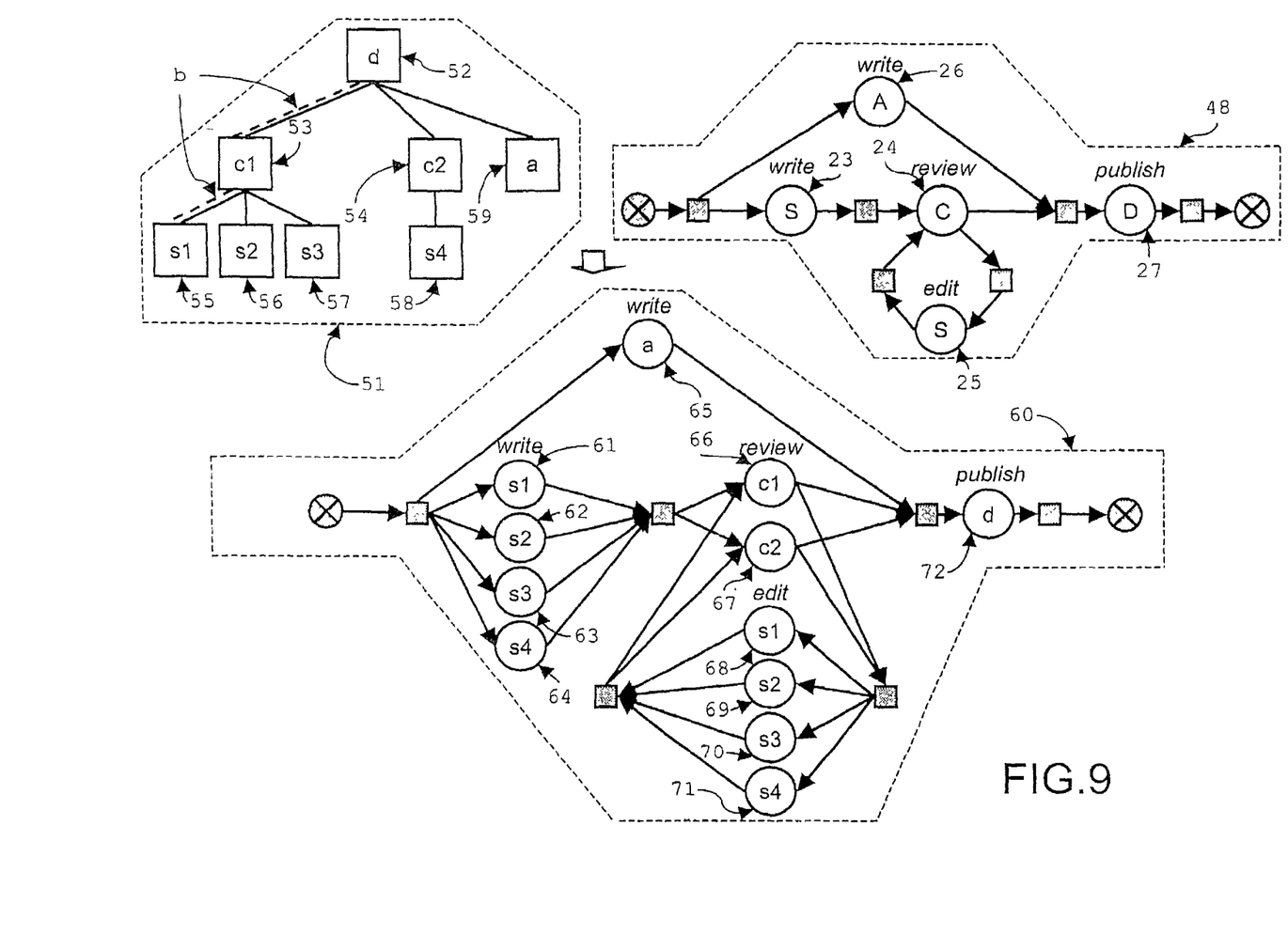
FIG. 9 shows the creation of a specific workflow in a further step in the method of FIG. 3, wherein the elements defined in a model of the composite object, based on the element type structure of FIG. 2, are associated with tasks comprised in the rearranged general workflow of FIG. 8.

Two subsequent steps 14 and 15 in the present method as shown in FIG. 3 are depicted in FIG. 9, for the example of the production of a document by the group members 1–4 of FIG. 1, according to an embodiment of the present invention.

In a step 14, a model 51 of the composite object is defined. This is a model of the actual composite object involved in the workflow to be created. It includes elements 52–59, which are instances of the element types 6–9 as defined in the element type structure of FIG. 2.

Thus, in FIG. 9, the model 51 comprises the document 52 to be created, which is an instance of the type 'Document' 6. The document 52 of this example consists of chapters c1 53 and c2 54, both instances of type 'Chapter' 7. The document has an appendix a 59. Chapter c1 53 consists of sections s1 55, s2 56 and s3 57. Chapter c2 54 contains only one section, section s4 58.

In the step 15 subsequent to the step 14 just described, the elements 52–59 are associated with tasks using the rearranged general workflow 48 of FIG. 8, in order to create a specific workflow 60. The specific workflow 60 is also a Petri-Net, including places 61–72 transitions and directed connections between the transitions and places. Whereas in the general workflow 48, each place 23–27 has an element type 6–9 associated with it, the places 61–72 in the specific workflow 60 are each associated with an element 52–59 in the model 51 of the composite object. The specific workflow 60 is created by making a copy of each place in the general workflow 48 for each instance of the type associated with the place, and by subsequently assigning an element with the type associated with the place to the created place. Extra directed connections are then added to connect the newly created places to the transitions.

In a last step 16 in the method as shown in FIG. 3 according to the invention, the specific workflow 60 obtained in the previous step 15 is rearranged.

The concept of interdependency is used in this step 16, just as it is used for creating the rearranged general workflow 48. It is defined in the same manner as before, but now it is used in the context of the model of the object in terms of elements and not that of the element type structure. Two elements of a composite object are interdependent when there is a directed path from the root element at the top of the object structure to an element at the lowest level in the structure, which passes through the two elements.

Referring to the model 51 of the composite object in FIG. 9, the elements c1 53 and s1 55 are interdependent, because these two elements 53 and 55 both lie on a directed path "b" from the document d 52, which is at the top level of the model 51, to the section s1 55, which is at the lowest level of the model 51.

Figure 10:
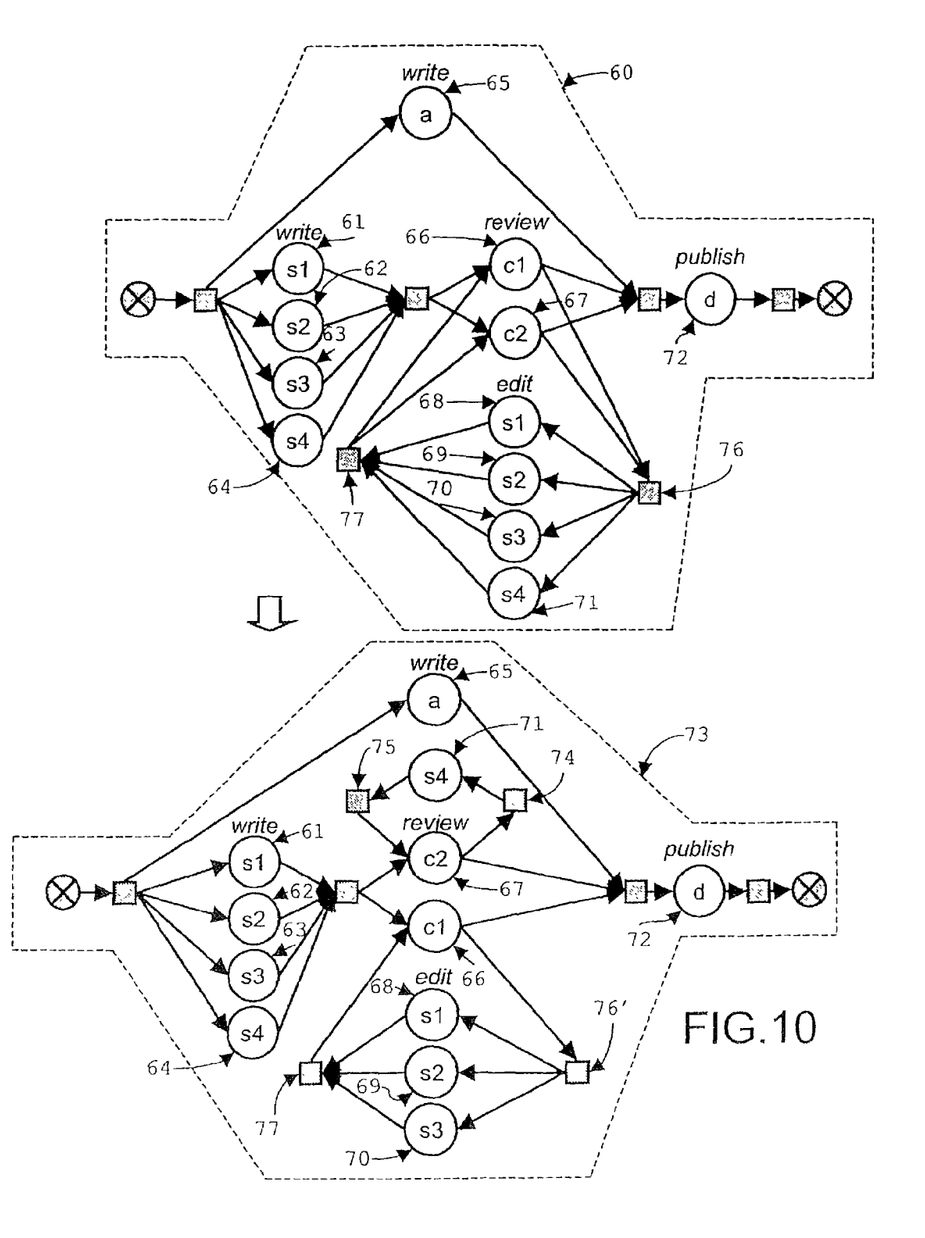
FIG. 10 shows one application of a further step in the method of FIG. 3 to the specific workflow of FIG. 9 in which the specific workflow is rearranged according to an embodiment of the present invention.

FIG. 10 depicts the application of the last step 16 in the present method of FIG. 3 to the specific workflow 60 created in the example of the previous step 15 according to an embodiment of the present invention. This last step 16 in the invention results in a rearranged specific workflow 73. Extra transitions are created for the rearranged specific workflow between two sequential places with interdependent associated elements, if all the output places of a transition have interdependent associated elements. Again, the result is to position places in parallel as much as possible.

For example, in FIG. 10, the place 71 representing the editing of section s4 58 is differently connected in the rearranged specific workflow 73. The place 67 representing the reviewing of chapter c2 54 is also differently connected. The transitions 76 and 77 between the two places 67 and 71 in the sub-optimal specific workflow 60 have been split, resulting in two extra transitions 74 and 75 respectively. The fact that not all the elements 53 and 54 associated with the places 66 and 67 leading up to the transition 76 are interdependent with all the elements 55–58 associated with the places 68–71 to which the transition 76 leads, is a cue for splitting up the transition 76 into two transitions 74 and 76'. The directed connections between the places and the transitions are then rearranged. For instance, only the places 68–70 and not the place 71 lead to the transition 77' which points to the place 66.

This copying of transitions and rearranging of directed connections when not all elements associated with input places are interdependent with the elements associated with all output places, is done for each transition in turn in the sub-optimal specific workflow 60, finally resulting in the rearranged specific workflow 73 according to the present invention. Then the method in FIG. 3 ends.

The present invention can be implemented by using an existing hardware and/or software such as a computer. Any known computer programming language can be used to implement the present invention.

Naturally, the invention is not limited to the described embodiments. It can be varied in any number of ways within the scope of the claims. In particular, the present method can be applied in numerous different settings to create a workflow with increased parallelism, i.e., in automated production processes of goods, or in scheduler programs for groups of coworkers. Also, the order of steps in the present method can be slightly varied without influencing the resultant workflow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A computer implemented method for creating a workflow including at least one structured process with interdependent tasks, and a composite object involved in the at least one structured process, wherein the method comprises the steps of:
    defining a model of the composite object, the model describing the composite object as an aggregate of constituent elements, wherein each of the constituent elements is an instance of an element type;
    creating a general workflow by modelling the at least one structured process as a structured graph, comprising task nodes with an associated element type and connected according to their dependencies without any state nodes inbetween;
    associating the tasks with the constituent elements according to the type of the elements to create a specific workflow, the associating step including rearranging the specific workflow based on the model of the composite object by rearranging the tasks on the basis of the associated element type for creating parallel task-element combinations in the specific workflow; and
    moving connections between two sequential tasks with associated elements, which operate on elements that are not identical and have no encompassing or constituent elements in common.

2. The method according to claim 1, further comprising the step of:
    checking a suitability of the general workflow for further use in the method.

3. The method according to claim 2, wherein, in the checking step, the suitability of the general workflow is checked by checking that branching paths in the general workflow split and join at tasks with the same associated element type.

4. The method according to claim 3, wherein, in the checking step, the suitability of the general workflow is checked further by checking that element types associated with tasks in the branching paths are not higher in a type hierarchy than the element types associated with the tasks where the branching paths split and join.

5. The method according to claim 1, wherein the step of defining the model of the composite object comprises creating a directed acyclical graph in which each of the constituent elements is assigned a position depending on its type and a relation to the other element types.

6. The method according claim 1, wherein the step of rearranging the general workflow includes moving connections between two sequential tasks which can be carried out in parallel in view of their associated element type, so that the sequential tasks can be carried out in parallel.

7. The method according to claim 1, wherein the step of associating comprises making a copy of a task with an associated element type in the general workflow for each element of the appropriate type.

8. The method according to claim 1, wherein at least one of the general workflow and the specific workflow is modelled as a Petri-Net including places, transitions, and directed connections between the places and transitions.

9. The method according to claim 8, wherein the tasks are represented as places.

10. A programmable processing device for creating a workflow including at least one structured process with interdependent tasks, and a composite object involved in the at least one structured process, wherein the programmable processing device comprises:
   means for defining a model of the composite object, the model describing the composite object as an aggregate of constituent elements, wherein each of the constituent elements is an instance of an element type;
   means for creating a general workflow by modelling the at least one structured process as a structured graph, comprising task nodes with an associated element type and connected according to their dependencies without any state nodes inbetween;
   means for associating the tasks with the constituent elements according to the type of the elements to create a specific workflow, by rearranging the specific workflow based on the model of the composite object by rearranging the tasks on the basis of the associated element type for creating parallel task-element combinations in the specific workflow; and
   means for moving connections between two sequential tasks with associated elements, which operate on elements that are not identical and have no encompassing or constituent elements in common.

11. The programmable processing device according to claim 10, further comprising:
   means for checking a suitability of the general workflow for further use.

12. The programmable processing device according to claim 11, wherein the means for checking the suitability of the general workflow checks that branching paths in the general workflow split and join at tasks with the same associated element type, and that element types associated with tasks in the branching paths are not higher in a type hierarchy than the element types associated with the tasks where the branching paths split and join.

13. The programmable processing device according to claim 10, wherein the means for defining the model of the composite object comprises means for creating a directed acyclical graph in which each of the constituent elements is assigned a position depending on its type and a relation to the other element types.

14. The programmable processing device according to claim 10, wherein the means for associating includes means for moving connections between two sequential tasks which can be carried out in parallel in view of their associated element type, so that the sequential tasks can be carried out in parallel.

15. The programmable processing device according to claim 10, wherein at least one of the general workflow and the specific workflow is modelled as a Petri-Net including places, transitions, and directed connections between the places and transitions.

16. A computer program product embodied on a computer readable medium, for creating a workflow including at least one structured process with interdependent tasks, and a composite object involved in the at least one structured process, wherein the computer program product comprises computer-executable instructions for:
   defining a model of the composite object, the model describing the composite object as an aggregate of constituent elements, wherein each of the constituent elements is an instance of an element type;
   creating a general workflow by modelling the at least one structured process as a structured graph, comprising task nodes with an associated element type and connected according to their dependencies without any state nodes inbetween;
   associating the tasks with the constituent elements according to the type of the elements to create a specific workflow, by rearranging the specific workflow based on the model of the composite object by rearranging the tasks on the basis of the associated element type for creating parallel task-element combinations in the specific workflow; and
   moving connections between two sequential tasks with associated elements, which operate on elements that are not identical and have no encompassing or constituent elements in common.

17. The computer program product according to claim 16, further comprising computer-executable instructions for:
   checking a suitability of the general workflow for further use.

18. The computer program product according to claim 17, wherein the suitability of the general workflow is checked by checking that branching paths in the general workflow split and join at tasks with the same associated element type, and that element types associated with tasks in the branching paths are not higher in a type hierarchy than the element types associated with the tasks where the branching paths split and join.

19. The computer program product according to claim 16, wherein the computer-executable instructions for defining the model of the composite object comprise computer-executable instructions for creating a directed acyclical graph in which each of the constituent elements is assigned a position depending on its type and a relation to the other element types.

20. The computer program product according to claim 16, wherein the computer-executable instructions for rearranging the general workflow include computer-executable instructions for moving connections between two sequential tasks which can be carried out in parallel in view of their associated element type, so that the sequential tasks can be carried out in parallel.

21. The computer program product according to claim 16, wherein at least one of the general workflow and the specific workflow is modelled as a Petri-Net including places, transitions, and directed connections between the places and transitions.

22. A computer readable medium having thereon a computer program product for creating a workflow including at least one structured process with interdependent tasks, and a composite object involved in the at least one structured process, wherein the computer program product comprises computer-executable instructions for:

defining a model of the composite object, the model describing the composite object as an aggregate of constituent elements, wherein each of the constituent elements is an instance of an element type;

creating a general workflow by modelling the at least one structured process as a structured graph, comprising task nodes with an associated element type and connected according to their dependencies without any state nodes inbetween;

associating the tasks with the constituent elements according to the type of the elements to create a specific workflow, by rearranging the specific workflow based on the model of the composite object by rearranging the tasks on the basis of the associated element type for creating parallel task-element combinations in the specific workflow; and moving connections between two sequential tasks with associated elements, which operate on elements that are not identical and have no encompassing or constituent elements in common.

\* \* \* \* \*